United States Patent [19]

Ricker et al.

[11] Patent Number: 4,986,614
[45] Date of Patent: Jan. 22, 1991

[54] MOTOR-DRIVEN ANTILOCK BRAKE PRESSURE MODULATOR HAVING DIFFERENTIAL MOTOR PERFORMANCE CHARACTERISTICS

[75] Inventors: Dennis J. Ricker, Huber Heights; Richard L. Foster, Beavercreek, both of Ohio

[73] Assignee: General Motors Corporation, Detroit, Mich.

[21] Appl. No.: 392,162

[22] Filed: Aug. 10, 1989

[51] Int. Cl.⁵ .................................................. B60T 8/58
[52] U.S. Cl. ...................................... 303/115; 303/100; 303/110; 303/61; 188/181 R
[58] Field of Search .................. 303/115, 113, 119, 91, 303/61–63, 100, 110, 20, 15; 318/254, 138, 258, 439; 188/181 R, 181 A, 181 C; 364/426.01, 426.02; 180/197

[56] References Cited

U.S. PATENT DOCUMENTS

| | | | |
|---|---|---|---|
| 3,549,210 | 12/1970 | Birge et al. | 303/61 X |
| 3,690,736 | 9/1972 | Smirl et al. | 303/61 X |
| 3,946,292 | 3/1976 | Tanikoshi | |
| 4,138,165 | 2/1979 | Blomberg et al. | 303/61 X |
| 4,544,868 | 10/1985 | Murty | |
| 4,664,453 | 5/1987 | Kade et al. | 303/100 |
| 4,673,225 | 6/1987 | Kade | 303/100 |
| 4,677,356 | 6/1987 | Tsuneda et al. | |
| 4,680,515 | 7/1987 | Crook | |
| 4,717,211 | 1/1988 | Dittner | 303/61 X |
| 4,740,734 | 4/1988 | Takeuchi et al. | |
| 4,748,387 | 5/1988 | Tanuma et al. | |
| 4,756,391 | 7/1988 | Agarwal et al. | 303/100 X |
| 4,763,049 | 8/1988 | Magee | |
| 4,824,184 | 4/1989 | Spadafora et al. | 303/100 |
| 4,835,695 | 5/1989 | Walenty et al. | 180/197 X |
| 4,881,784 | 11/1989 | Leppek | 303/110 X |
| 4,917,445 | 4/1990 | Leppek et al. | 303/115 X |

*Primary Examiner*—Douglas C. Butler
*Attorney, Agent, or Firm*—Mark A. Navarre

[57] ABSTRACT

An electric motor-driven brake pressure modulator motor is designed and controlled to exhibit different speed/torque performance characteristics depending on the direction of motor rotation. In the forward direction when the brake pressure is being applied, the torque characteristic of the motor is maximized to develop adequate brake pressure. In the reverse direction when the brake pressure is being relieved, the speed characteristic of the motor is maximized to quickly relieve the brake pressure. The result is an antilock braking system in which the braking performance is maximized without the design compromise penalties of presently known systems.

1 Claim, 3 Drawing Sheets

MOTOR-DRIVEN ANTILOCK BRAKE PRESSURE MODULATOR HAVING DIFFERENTIAL MOTOR PERFORMANCE CHARACTERISTICS

This invention relates to an electric motor driven brake pressure modulator for a motor vehicle antilock braking system, and more particularly to a modulator including a bidirectional electric motor having differential performance characteristics depending on the direction of motor rotation.

BACKGROUND OF THE INVENTION

An electric motor-driven antilock braking system of the type to which this invention pertains is generally depicted in FIG. 1. Referring to FIG. 1, the braking system comprises a hydraulic boost unit 100, a wheel brake 102, an electric motor-driven hydraulic pressure modulator 104, and an electronic controller 106 for operating the modulator 104 with current from the vehicle storage battery 108. The boost unit 100 develops hydraulic pressure in line 120 in relation to the force applied to an operator manipulated brake pedal, the line 120 being connected to the brake 102 via modulator 104 and brake line 122. Brake 102 is depicted as a disk brake caliper which develops braking force on the wheel rotor 126 in relation to the hydraulic pressure in brake line 122.

The modulator 104 comprises an armature 130 axially displaceable in the modulator bore 132, a check ball 134 resiliently seated on a ball seat 136 disposed between the brake lines 120 and 122, and a bidirectional electric motor 138 coupled to the armature 130 via a reduction gearset 140 and a ball screw actuator 142 to control the axial displacement of armature 130.

Energization of the motor 138 is controlled by the electronic controller 106 in response to a signal on line 144 indicative of the angular velocity of rotor 126. When the controller 106 energizes the motor 138 for rotation in a forward direction, the ball screw actuator 142 extends into the bore 132, thereby extending armature 130 to unseat the check ball 134. This opens the communication between brake lines 120 and 122, and represents the normal or quiescent state of the antilock brake system. When the controller 106 energizes the motor 138 for rotation in the opposite, or reverse, direction, the ball screw actuator 142 retracts armature 130 within the bore 132, permitting spring 146 and the fluid pressure in brake line 120 to seat the check ball 134 on the ball seat 136, thereby isolating the brake line 122 from the brake line 120. In this condition, the brake fluid in line 122 backfills the modulator bore 132, relieving the fluid pressure developed at brake 102.

In antilock operation, the brake pressure in line 122 is modulated by repeatedly reversing the direction of rotation of motor 138 to effect a dithering movement of the armature 130 in the bore 132. When an incipient wheel lock condition is detected, the controller 106 causes the motor 138 to rotate in the reverse direction to retract the armature 130; when recovery of the wheel speed is detected, the controller 106 causes the motor 138 to rotate in the forward direction to extend the armature 130 for increasing the brake pressure.

During the antilock operation described above, optimum braking performance requires different motor speed/torque characteristics depending on the direction of motor rotation. When the armature 130 is being retracted (reverse direction of rotation), the torque requirement is relatively low, but the speed requirement is relatively high in order to enable quick relief of the brake pressure. When the armature 130 is being extended (forward direction of rotation), the speed requirement is relatively low, but the torque requirement is relatively high in order to develop adequate pressure in brake line 122. Unfortunately, the speed/torque characteristics of a conventional electric motor are substantially the same in both directions, and some design compromises must be made in order to provide acceptable performance in both the forward and reverse directions of motor rotation. Of course, this involves some sacrifice in the antilock braking performance.

SUMMARY OF THE PRESENT INVENTION

The present invention is directed to an improved electric motor-driven brake pressure modulator for an antilock braking system of the above type in which the motor is designed and controlled to exhibit different speed/torque performance characteristics depending on the direction of motor rotation.

In the forward direction of motor rotation when the armature 130 is extended to increase the pressure in brake line 122, the torque characteristic of the motor 138 is maximized for the development of adequate brake pressure. In the reverse direction of motor rotation when the armature 130 is retracted within the bore 132, the speed characteristic of the motor 138 is maximized to quickly reduce the brake pressure The result is an antilock braking system in which the braking performance is maximized without the design compromise penalties of presently known systems.

In the illustrated embodiment, the differential motor performance characteristic is carried out with a brushless DC motor having multi-phase stator windings which are selectively energized in either the full-wave or half-wave mode. In the forward direction of motor rotation, the stator windings are energized with bidirectional current via a full-wave bridge. In this case, two or more of the windings are always active (energized), and the motor torque is maximized for developing the required brake pressure. In the reverse direction of motor rotation, the stator windings are energized with unidirectional current via a half-wave bridge. In this case, the applied voltage is greater and the number of active windings at any point in time is reduced, as compared to the full-wave example. This maximizes the motor speed to relatively quickly retract the armature 130 within the valve bore 132 to relieve the brake pressure.

It should be understood that the present invention is broadly directed to a motor-driven antilock brake pressure modulator having a differential torque/speed performance characteristic, and is not limited to the full-wave/half-wave control arrangement described above. Indeed, such control arrangement is the subject of our co-pending patent application Ser. No. 334,417, filed Apr. 7, 1989, and assigned to the same assignee as the present invention.

DETAILED DESCRIPTION OF THE DRAWINGS

Figure 1:
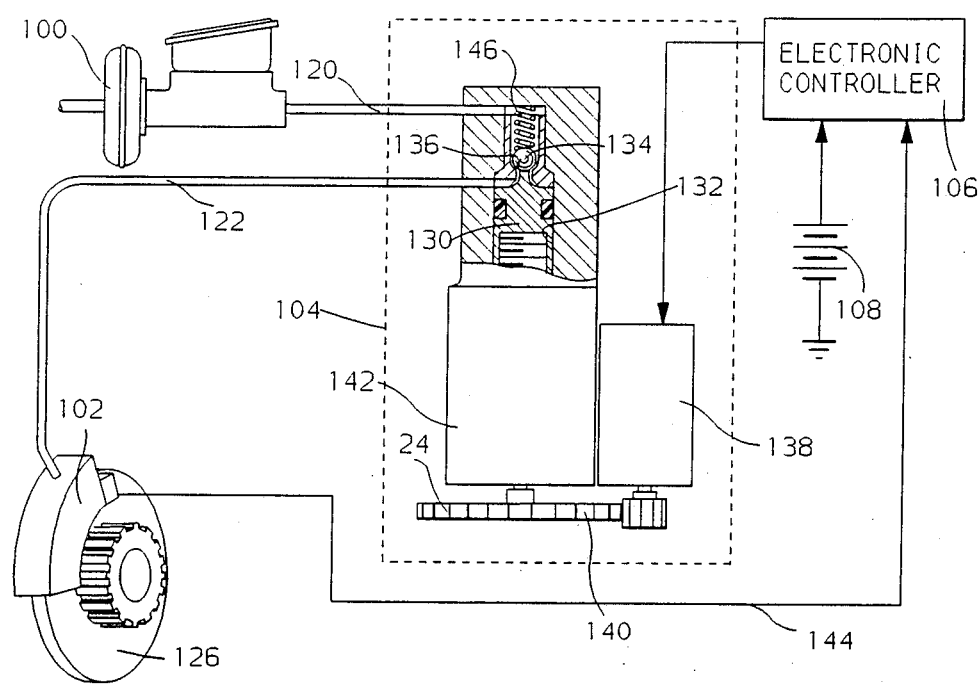
FIG. 1 is a system drawing of a vehicular antilock braking system of the type to which the present invention pertains.
Figure 2:
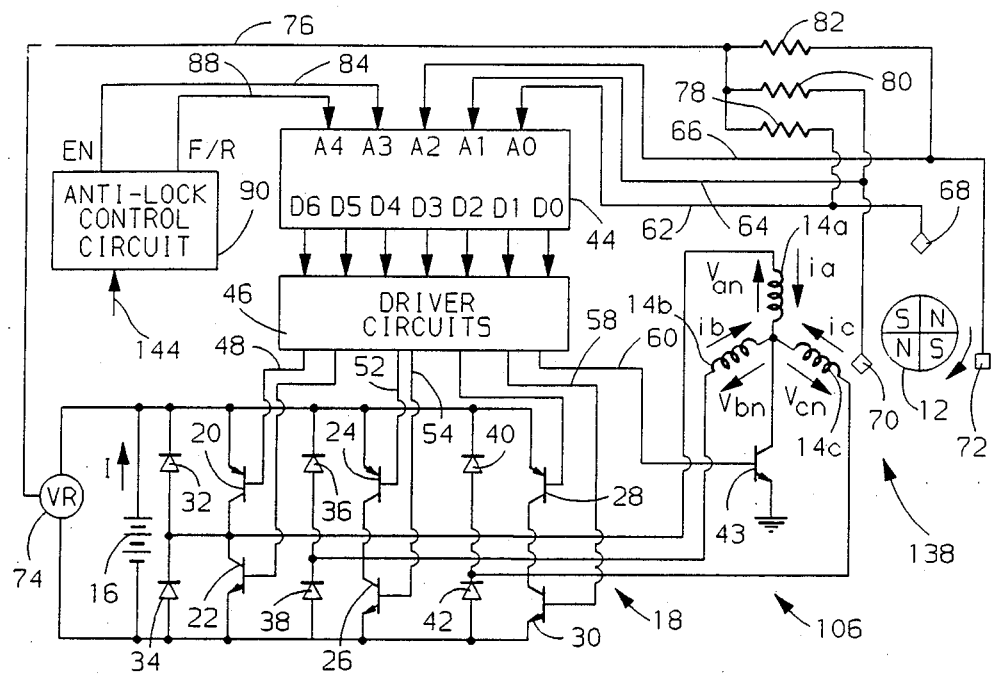
FIG. 2 is a block diagram of a three-phase brushless DC motor and the controller of the present invention.

Referring to FIG. 2, the reference numeral 138 generally designates a brushless DC motor comprising a permanent magnet rotor 12 and three stator windings 14a, 14b and 14c. The stator windings 14a, 14b and 14c are mutually connected at one end to a common terminal C and individually connected at their other ends to the storage battery 108 via upper and lower transistors of a full-wave bridge 18. Thus, the winding 14a is connected to the battery 108 via the upper and lower bridge transistors 20 and 22; the winding 14b is connected to the battery 108 via the upper and lower bridge transistors 24 and 26; and the winding 14c is connected to the battery 108 via the upper and lower bridge transistors 28 and 30. The freewheeling diodes 32, 34, 36, 38, 40, 42 are connected across the emitter-collector circuits of the bridge transistors 20, 22, 24, 26, 28, 30 for circulating inductive energy at deenergization of the respective stator windings.

The transistor 43 is connected between the winding common terminal C and the negative (grounded) terminal of storage battery 108. When transistor 43 is nonconductive, the common terminal C is electrically isolated from the battery 108 and the bridge 18 can be operated in a full-wave mode to produce maximum motor output torque. When transistor 43 is conductive, the common terminal C is electrically connected to battery 108 and the upper transistors 20, 24 and 28 of bridge 18 can be operated in a half-wave mode to produce maximum motor output speed.

The common grounding transistor 43 and the bridge transistors 20, 22, 24, 26, 28 and 30 are controlled by the Read-Only Memory ROM 44 data outputs D0–D6 via driver circuit 46 and lines 60, 48, 50, 52, 54, 56 and 58, respectively. In full-wave operation, the data line D0 is maintained at a logic zero to bias transistor 43 nonconductive and pairs of the data lines D1, D2, D3, D4, D5 and D6 sequentially alternate between logic zero and logic one to effect bidirectional energization of the stator windings 14a, 14b and 14c. In half-wave operation, the data line D0 is maintained at a logic one to bias transistor 43 conductive, the data lines D1, D3 and D5 are maintained at a logic zero potential to bias the lower bridge transistors 22, 26 and 30 nonconductive, and the data lines D2, D4 and D6 sequentially alternate between logic zero and logic one to effect unidirectional energization of the stator windings 14a, 14b and 14c.

The logic level present at the data lines D0–D6 of ROM 44, and hence, the motor winding energization pattern, is controlled as a function of the logic level of the five ROM address inputs A0–A4. The inputs A0, A1 and A2 are obtained directly via lines 62, 64 and 66 from the sensors 68, 70 and 72. The sensors 68, 70 and 72 are situated 120 electrical degrees apart in the magnetic field of rotor 12 and provide an indication of the rotor position. In the illustrated embodiment, the sensors 68, 70 and 72 are of the Hall effect type; however, sensors of another type or any rotor position encoder or EMF sensing arrangement could be used. The sensors 68, 70 and 72 are normally in a high impedance state and toggle to a low impedance (logic zero) state when the rotor 12 is in a predetermined position. The lines 62, 64 and 66 are connected via resistors 78, 80 and 82 to the output line 76 of voltage regulator 74 to establish a normally high logic potential at the address inputs A0, A1 and A2.

The inputs A3 and A4 of ROM 44 are externally generated by an anti-lock control circuit, designated by the block 90. The control circuit 90 generates an enable (EN) signal on line 84 for ROM address line A3 to turn the motor 138 on or off, and a forward/reverse (F/R) signal on line 88 for ROM address line A4 to designate the desired direction of motor rotation.

In the forward direction of motor rotation when the armature 130 is extended to unseat the check ball 134 against the hydraulic and spring forces, the full-wave mode is engaged to maximize the torque characteristic of the motor 138. In the reverse direction of motor rotation when the ball screw actuator 142 is retracted within the bore 132, the half-wave mode is engaged to maximize the speed characteristic of motor 138.

Figure 3:
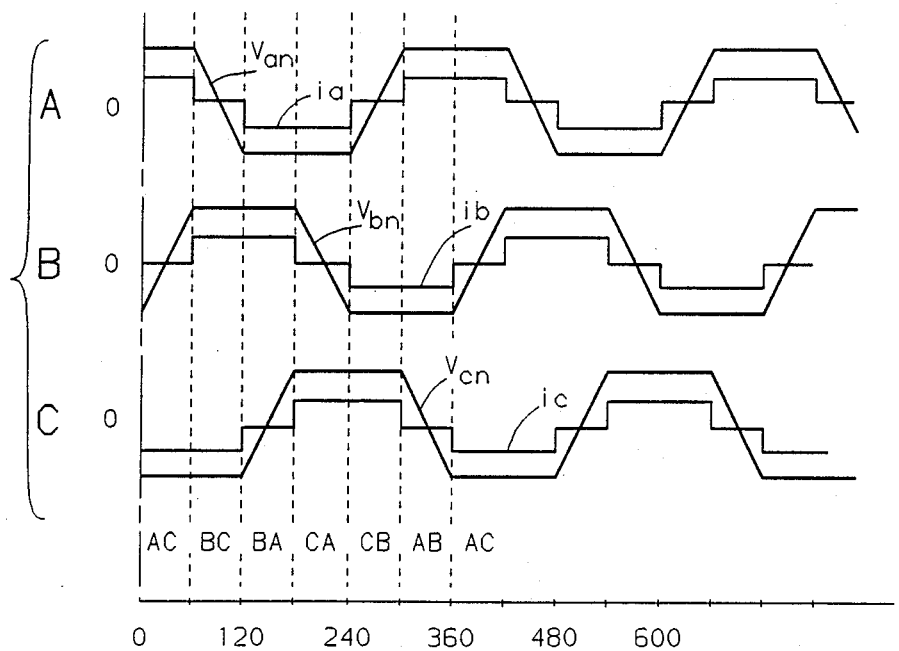
FIGS. 3 and 4 depict the voltage and current waveforms for the motor phase windings in the full-wave and half-wave modes of operation, respectively.

FIG. 3 depicts idealized voltage and current waveforms for the phase windings 14a–14c as a function of rotor position in electrical degrees during forward motor rotation in the full-wave mode. Graph A depicts the line-to-common phase voltage $V_{an}$ and phase current ia for the phase winding 14a; Graph B depicts the line-to-common phase voltage $V_{bn}$ and phase current ib for the phase winding 14b; and Graph C depicts the line-to-common phase voltage $V_{cn}$ and phase current ic for the phase winding 14c.

Since two bridge transistors are always conductive, six different stator winding energization patterns are possible, such patterns being designated as AC, AB, CA, CB, BA and BC. The first designation letter refers to the stator winding (14a, 14b or 14c) connected through a bridge transistor to the positive terminal of battery 108, and the second letter designation refers to a stator winding connected through a bridge transistor to the negative (grounded) terminal of battery 108. Each stator winding energization pattern produces a distinct stator magnetic field, and the conduction of the various bridge transistors is controlled by ROM 44 and the rotor position sensors 68, 70, 72 such that the magnetic axis of the stator maintains a predetermined relationship with respect to the magnetic axis of the rotor 12.

More particularly, the stator winding energization patterns are selected so that the magnetic axis of the stator leads the rotor field axis by between 60 and 120 electrical degrees, the motor torque thereby produced being maximum when the phase difference is 90 electrical degrees. The information for maintaining this sequence is obtained from the rotor position sensors 68, 70 and 72 which, due to their orientation with respect to the rotor magnetic field, indicate six distinct regions of rotor position. If the forward direction of motor rotation is defined as being clockwise (CW), the correct stator winding energization sequence pattern is AC, BC, BA, CA, CB and AB. Each such stator winding energization pattern is maintained for 60 electrical degrees of rotor rotation, as indicated in FIG. 3, and the patterns taken together occupy 360 electrical degrees or one complete cycle.

Reverse motor rotation is obtained by providing the opposite stator winding energization pattern for a given rotor position. Thus, the stator winding energization pattern sequence for reverse motor rotation is CA, BA, BC, AC, AB and CB.

Figure 4:
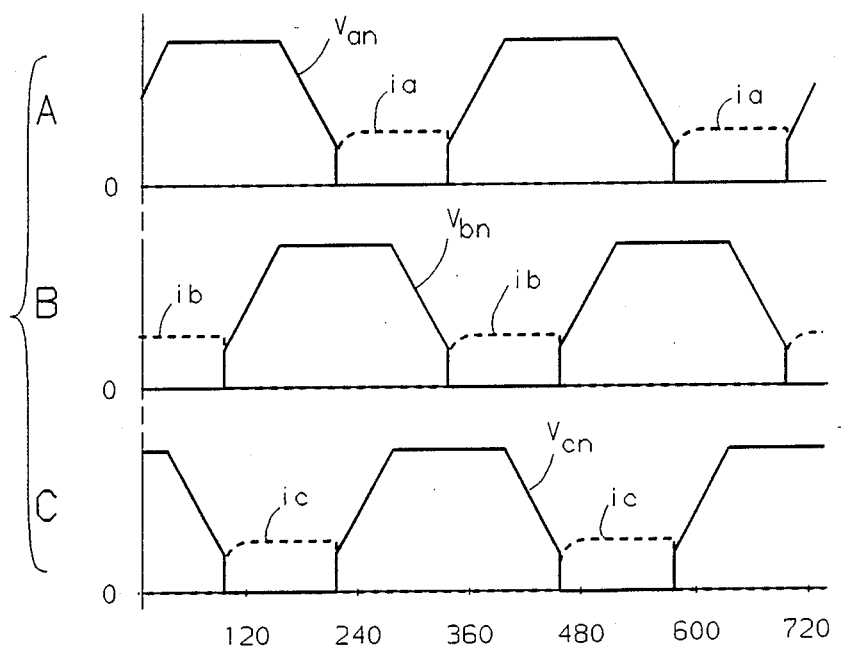

FIG. 4 depicts idealized voltage and current waveforms for the phase windings 14a–14c as a function of rotor position in electrical degrees during forward motor rotation in the half-wave mode. As in FIG. 3, Graph A depicts the line-to-common phase voltage $V_{an}$ and phase current ia for the phase winding 14a, Graph B depicts the line-to-common phase voltage $V_{bn}$ and phase current ib for the phase winding 14b, and Graph C depicts the line-to-common phase voltage $V_{cn}$ and phase current ic for the phase winding 14c. In this case, however, the common terminal C is maintained substantially at ground potential.

In half-wave operation, the phase windings 14a–14c are simply energized in sequence based on rotor position, as shown in FIG. 3. The sequence A, B, C is produced for forward motor rotation, while the sequence C, B, A is produced for reverse motor rotation.

The winding energization sequence actually produced by ROM 44 depends on the state of the address input A4. So long as the address input A4 is maintained at a logic one potential, ROM 44 will produce a full-wave winding energization pattern in the forward sequence; so long as the address input A4 is maintained at a logic zero potential, ROM 44 will produce a half-wave winding energization pattern in the reverse sequence.

The EN (A3) input of ROM 44 is used to alternately enable or disable energization of the motor windings. So long as the address input A3 is maintained at a logic one potential, ROM 44 will produce the appropriate winding energization patterns as described above. However, when the address input A4 is maintained at a logic zero potential, the data line outputs of ROM 44 will bias the common grounding transistor 43 and all of the bridge transistors 20, 22, 24, 26, 28 and 30 nonconductive. Alternately, the EN input could be pulsed high and low during the on periods of motor 138 to modulate the motor winding energization, if desired.

Figure 5:
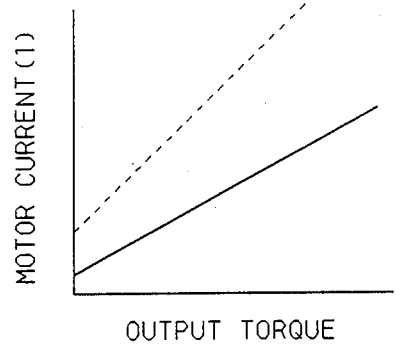
FIG. 5 depicts the motor current v. motor torque characteristics for the full-wave and half-wave modes of operation.
Figure 6:
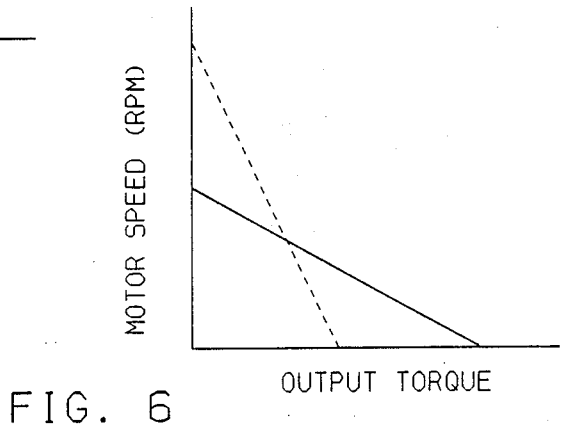
FIG. 6 depicts the motor speed v. motor torque characteristics for the full-wave and half-wave modes of operation.

FIGS. 5 and 6 compare the operating characteristics of motor 138 during the forward and reverse directions of motor rotation. FIG. 5 depicts the bridge or battery current I as a function of motor output torque, and FIG. 6 depicts the motor speed as a function of motor output torque. In each case, the half-wave characteristic is designated by the broken trace and the full-wave characteristic is designated by the solid trace.

Referring to FIG. 5, it will be seen that the torque per unit current of the full-wave motor is substantially greater than that of the half-wave motor. Since, as a practical matter, the motor current is limited in relation to the size of the stator windings, the torque capability of the full-wave motor clearly exceeds that of the half-wave motor. In practice, the torque advantage may be on the order of 2:1.

Referring to FIG. 6, it will be seen that the speed of rotation of the half-wave motor is significantly greater than that of the full-wave motor for any given level of output torque. In practice, the speed advance may be on the order of 2:1.

In the manner described above, the antilock braking system of this invention provides improved antilock braking performance without suffering the design compromise penalties of presently known systems. While described in reference to the illustrated embodiment, it will be recognized that various modifications will occur to those skilled in the art, and that systems incorporating such modifications may fall within the scope of this invention which is defined by the appended claims.

We claim:

1. A vehicle anti-lock brake system comprising:
   pressure modulator means having an armature displaceable for increasing and decreasing a fluid brake pressure;
   a motor driven actuator connected to said pressure modulator means for regulating the displacement of said armature, the motor having a set of windings which are electrically energizeable to develop torque and speed characteristics determined by such energization; and
   control means effective (1) when an increase in said fluid brake pressure is desired for energizing a relatively large number of said windings so as to maximize said torque characteristic, and (2) when a decrease in said fluid brake pressure is desired for energizing a relatively small number of said windings so as to maximize said speed characteristic, thereby to provide a direction dependent differential torque/speed characteristic.

* * * * *